United States Patent
Abdul Bari et al.

(10) Patent No.: US 12,510,140 B2
(45) Date of Patent: Dec. 30, 2025

(54) TRIMMABLE HORIZONTAL STABILISER ACTUATOR SECONDARY LOAD PATH DETECTOR

(71) Applicant: GOODRICH ACTUATION SYSTEMS SAS, Vernon (FR)

(72) Inventors: Anh Vu Abdul Bari, Franconville (FR); Rui Amaral, Chambly (FR)

(73) Assignee: GOODRICH ACTUATION SYSTEMS SAS, Vernon (FR)

( * ) Notice: Subject to any disclaimer, the term of this patent is extended or adjusted under 35 U.S.C. 154(b) by 0 days.

(21) Appl. No.: 18/662,263

(22) Filed: May 13, 2024

(65) Prior Publication Data

US 2024/0376967 A1 Nov. 14, 2024

(30) Foreign Application Priority Data

May 12, 2023 (EP) ..................... 23305758

(51) Int. Cl.
*F16H 25/20* (2006.01)
*B64C 13/28* (2006.01)

(52) U.S. Cl.
CPC ........... *F16H 25/205* (2013.01); *B64C 13/28* (2013.01)

(58) Field of Classification Search
CPC .... F16H 25/205; F16H 25/2472; B64C 13/28
See application file for complete search history.

(56) References Cited

U.S. PATENT DOCUMENTS

| | | |
|---|---|---|
| 8,985,510 B2 | 3/2015 | Hale |
| 10,155,582 B2 | 12/2018 | Medina et al. |
| 10,974,846 B2 | 4/2021 | Hale et al. |
| 2016/0281826 A1 | 9/2016 | Medina et al. |
| 2018/0194454 A1 | 7/2018 | Olson et al. |
| 2021/0062898 A1* | 3/2021 | Medina ................. B64C 13/341 |

FOREIGN PATENT DOCUMENTS

EP 3789294 A1 3/2021

OTHER PUBLICATIONS

European Search Report for Application No. 23305758.7, mailed Oct. 9, 2023, 9 pages.

* cited by examiner

*Primary Examiner* — Terence Boes

(74) *Attorney, Agent, or Firm* — CANTOR COLBURN LLP

(57) ABSTRACT

A secondary load path assembly includes: a secondary load path comprising: a plate; a secondary nut; and a transfer plate secured to the plate and configured to connect the plate and the secondary nut in load transfer engagement. The transfer plate has an opening therethrough, an axis defined through the opening, and the secondary nut protruding axially through the opening; wherein, in a state in which load is not transmitted via the secondary load path, a clearance is provided between the secondary nut and the opening. The assembly also includes a locking unit configured to lock the secondary nut to the transfer plate when load is to be transmitted through the secondary path, the locking unit comprising a lock arranged to axially move to a lock position in which it is located in the clearance between the secondary nut and the opening to lock the secondary nut to the transfer plate.

12 Claims, 3 Drawing Sheets

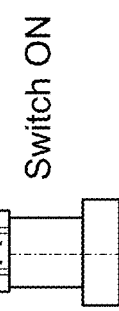
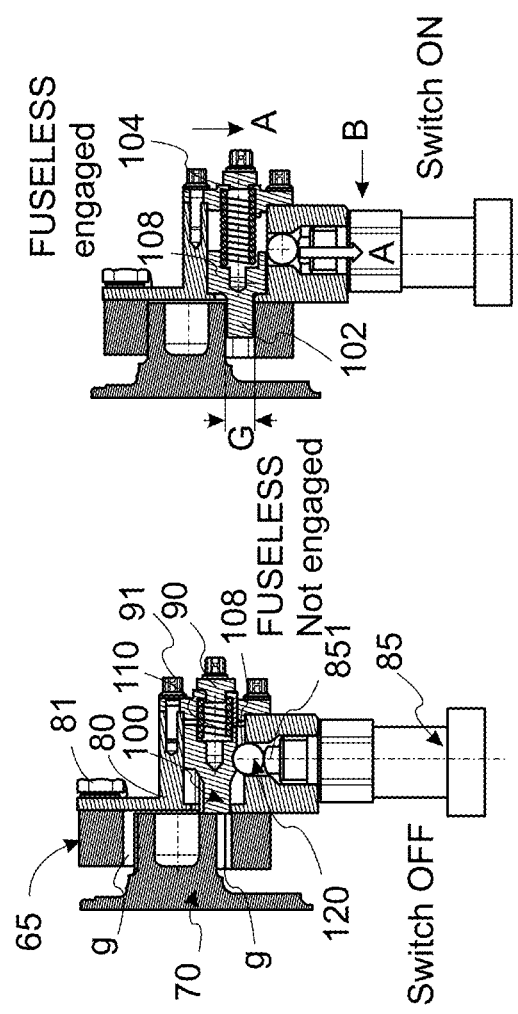
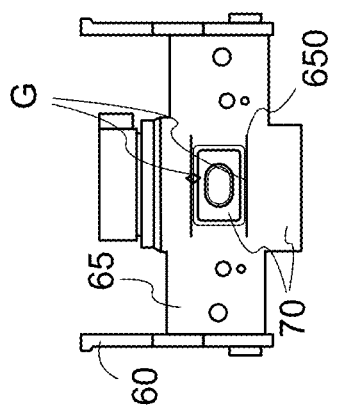
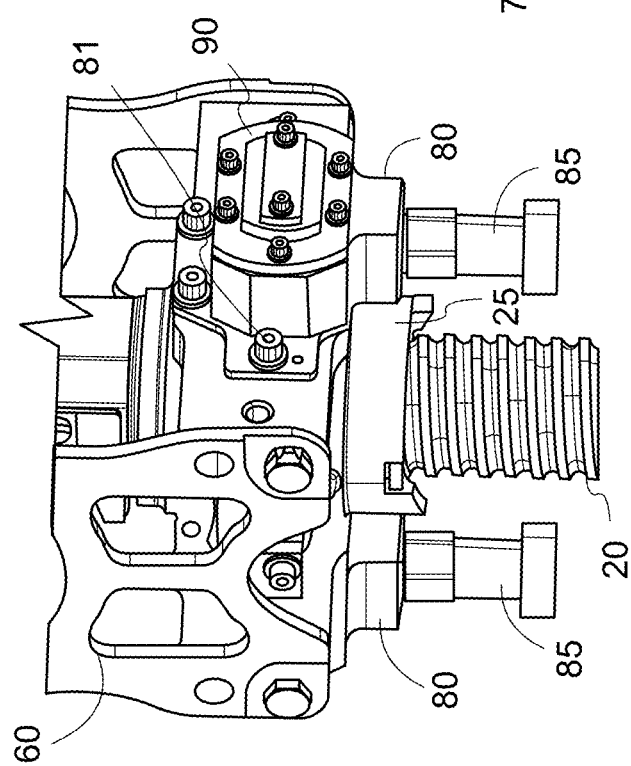

TRIMMABLE HORIZONTAL STABILISER ACTUATOR SECONDARY LOAD PATH DETECTOR

CROSS REFERENCE TO RELATED APPLICATIONS

This application claims priority to European Patent Application No. 23305758.7 filed May 12, 2023, the entire contents of which is incorporated herein by reference.

TECHNICAL FIELD

The disclosure relates to an assembly for a flight actuator such as a trimmable horizontal stabiliser actuator (THSA). In particular, it relates to an assembly for detecting engagement of a secondary load path for an actuator that has a primary load path and a secondary load path.

BACKGROUND

It is well known for a flight actuator to include two mechanical load paths, one primary and the other secondary, with the latter intended to take up the load when the primary path has failed. In a typical actuator such as a THSA, when operating on the primary load path the loads are transmitted from the screw through a primary nut. The assembly includes a failsafe plate, which is connected to the primary nut with a small amount of play. During normal operation, when the primary load path is working correctly, the secondary load path formed by this failsafe plate carries no load since there is no contact due to the small amount of play. However, in the event of a failure of the primary load path then the failsafe plate performs its failsafe function and ensures continuity of the transmission of loads by the actuator via the secondary load path.

Although such failsafe features are generally reliable, they can fail. It is important, particularly in safety critical applications such as aircraft, to have some reliable means for detecting when the load is being carried by the secondary load path. In the aircraft industry, regulations require such a function to be in place. Whilst it may be that a manual check is required, some assemblies do have devices to check for engagement of the secondary load path. Furthermore, the health/integrity of the means for detecting engagement of the secondary load path must itself be checkable. Again, in the aircraft industry, this is a regulatory requirement.

In some THSAs, loading of the secondary load path is detected by a so-called checkable shear pin. This is provided on a lower attachment secondary load path of the THSA. In the event of primary load failure, the checkable shear pin will provide an indication to the flight control computers of the secondary load path engagement.

Although devices such as the checkable shear pin provide a reliable, and checkable way of detecting engagement of the secondary load path, these devices may be complex and made up of several parts. Further, a problem that arises when switching from the primary load path to the secondary load path is that backlash may be created due to relative movement between the secondary load path parts. Backlash may be undesirable in many applications e.g. it may result in so-called 'flutters' in THSA operation.

There is a need for an improved system in which, on failure, load is switched to be transferred from the primary load path to the secondary load path without any or relative movement between the secondary load path parts that results in backlash, or at least with only a very low level of backlash, and that the assembly includes a reliable way of detecting engagement of the secondary load path using a device whose function can be checked or validated.

SUMMARY

According to the present disclosure, there is provided a secondary load path assembly comprising: a secondary load path comprising: a plate; a secondary nut; and a transfer plate secured to the plate and configured to connect the plate and the secondary nut in load transfer engagement, the transfer plate having an opening therethrough, an axis defined through the opening, and the secondary nut protruding axially through the opening; wherein, in a state in which load is not transmitted via the secondary load path, a clearance is provided between the secondary nut and the opening; the assembly further comprising: a locking unit configured to lock the secondary nut to the transfer plate when load is to be transmitted through the secondary path, the locking unit comprising a lock arranged to axially move to a lock position in which it is located in the clearance between the secondary nut and the opening to lock the secondary nut to the transfer plate.

In embodiments, the secondary load transfer path is part of a load transfer assembly such as a THSA with a primary load transfer path.

BRIEF DESCRIPTION OF THE FIGURES

Examples of an assembly according to this disclosure will now be described by way of example only and with reference to the drawings. It should be noted that variations are possible within the scope of the claims.

FIG. 3 shows an example of the THSA primary and secondary load path parts incorporating a checkable secondary load path detection assembly according to the disclosure.

FIGS. 4A, 4B, 4C and 4D are shown for explaining the locking operation of the checkable secondary load path detection assembly according to the disclosure.

DETAILED DESCRIPTION

Figure 1:
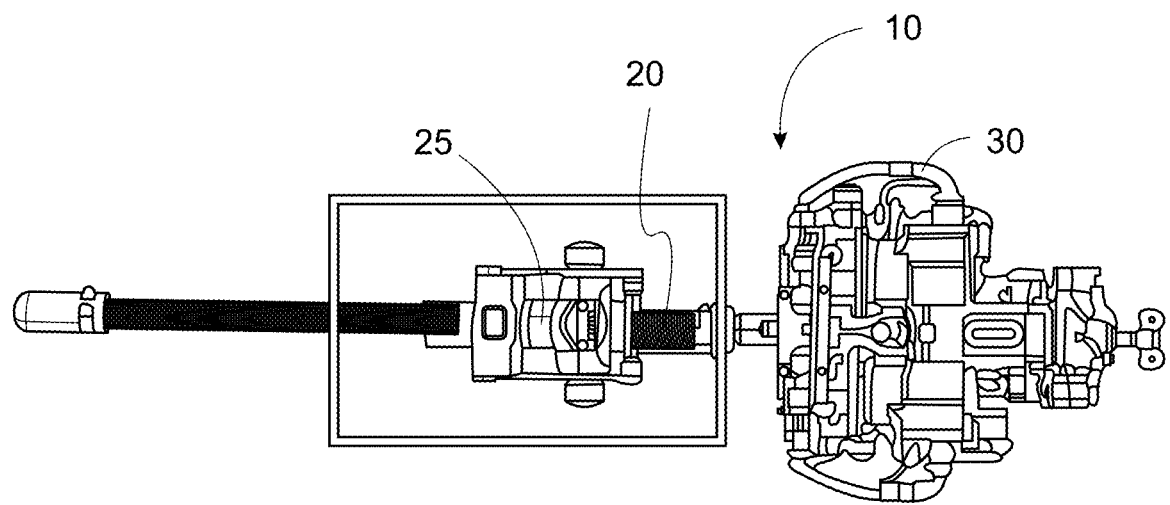
FIG. 1 shows an example of a typical THSA by way of background.
Figure 2:
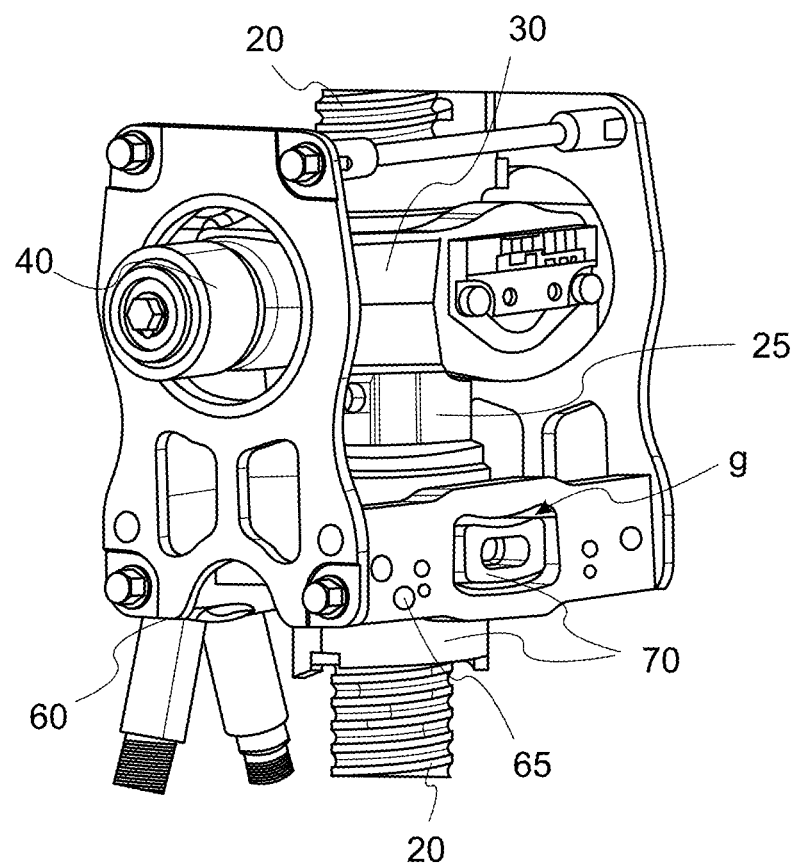
FIG. 2 shows, in more detail, the primary and second load path paths.

With reference to FIGS. 1 and 2, a typical known flight control actuator 10 of the trimmable horizontal stabiliser actuator (THSA) type includes a primary load path with a hollow screw 20 connected at its upper end to the aircraft via a Cardan joint system 30 joining with first aircraft structural elements (not shown). The primary load path further includes a primary nut 25 mounted on the screw 20, and the primary nut 25 is connected to the stabiliser (not shown) of the aircraft. In normal operation, the primary nut 25 is loaded by an external load at the bearing 40 level and a gimbal 50. In other words, the loads transfer from the stabiliser and bearing 40 to the gimbal 50 and the screw 20. In this operation, the secondary load path parts (described further below) are not engaged due to a clearance between the transfer plate 65 and the secondary nut 70.

If the primary load path fails e.g. due to failure at the gimbal 50 or the bearing 40 or loss of/damage to the balls of the primary nut 25, the load passes, instead, to the failsafe plate 60 to a transfer plate 65 to a secondary nut 70 around the screw 25—i.e. along the secondary load path. There is relative movement between the transfer plate 65 and the secondary nut 70 to close the clearance and engage the secondary load path parts.

It is important to note that the failsafe plate 60 is securely attached to the aircraft such that if, for example, only one bearing fails (i.e. on one side of the assembly), the entire secondary load path with translate.

If, when the secondary load path is engaged, relative movement remains possible between the transfer plate 65 and the secondary nut 70, this can cause flutter in the THSA which can affect flight.

The assembly according to this disclosure therefore functions to securely lock the failsafe plate 60, via the transfer plate 65, to the secondary nut 70 when the secondary load path is engaged, to avoid backlash.

The assembly comprises a locking unit 80 that is mounted to the transfer plate 65 e.g. by means of a nut and bolt 81 or other fastener. A maintenance cap 90 is affixed to cover the locking components parts (described further below) in the locking unit 80. The maintenance cap 90 may be fastened by screws or nuts and bolts or other fasteners 91. In one example, two such locking units are provided, one on each side of the load path assembly, between the opposing failsafe plates 60, as seen in FIG. 3. A switch 85 is located in and extends from the locking unit 80.

Figure 5A:
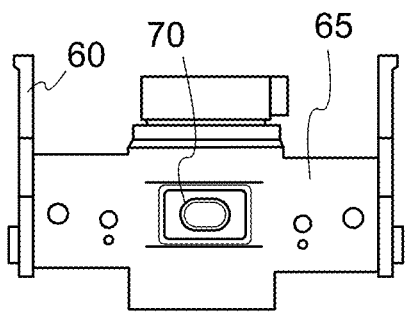
FIGS. 5A, 5B and 5C are used to illustrate how the checkable secondary load path detection assembly according to the disclosure is checked.
Figures 5B, 5C:
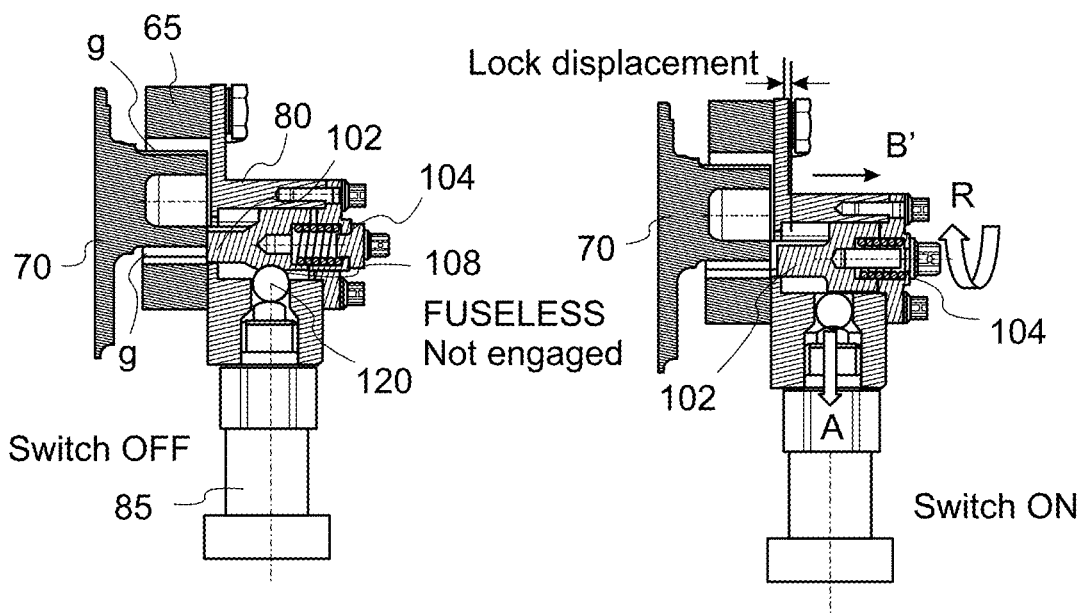
Figure 6:
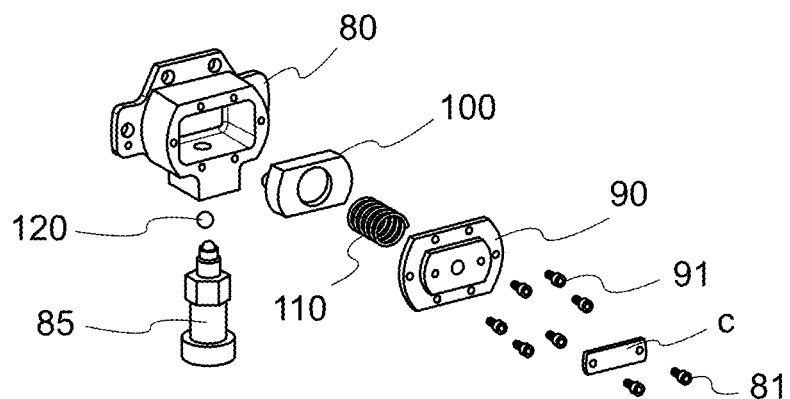
FIG. 6 is an exploded view of the lock unit.

The locking component parts comprise a slidable lock 100, slidably located within the body of the locking unit 80 and a lock spring 110 extending into and arranged to bias the lock for movement in the body of the lock unit. A ball 120 is located between the end 851 of the switch 85 that extends into the locking unit 80 and the slidable lock 100 as will be described further below. The slidable lock has a locking end 102 and an opposite end 103 in engagement with the spring 110. The opposite end has a greater diameter than the locking end, the locking end having a smaller diameter than the interior of the body of the locking unit, the opposite end having a diameter approximately equal to the body interior, while still allowing slidable movement between the lock and the body interior. A curved recess 108 is formed in the wide diameter part of the lock between the locking end and the opposite end, shaped and sized to receive the ball 120 when the lock is in the unlocked position (FIGS. 4C and 5B).

FIGS. 4A and 4C show the assembly in normal operating condition when load is transferred via the primary load path and the secondary load path is not engaged. In this state, a clearance g (e.g. around 4 mm, but this is only one example and the clearance will depend on the design and application) exists between the transfer plate 65 and the secondary nut 70 around the secondary nut where it protrudes through an opening 650 in the transfer plate 65. The clearance will be all around the secondary nut between the nut and the opening 650 so that there is not force transfer engagement between the transfer plate and the secondary nut. The sectional view through the lock unit, in this unlocked state is shown in FIG. 4C. The lock 100 here is seated behind the secondary nut, and forced by the secondary nut inside the locking unit 80, and compresses the spring 110.

As mentioned above, when the primary load path fails and the load transfers through the secondary load path, there is relative movement between the secondary nut and the transfer plate as seen in FIG. 4B, whereby the transfer plate 65 engages with the secondary nut 70 along one side of the opening 650, thus closing the clearance along that side, but this creates a larger gap G between the transfer plate and the secondary nut along the other side of the opening 650. If the transfer plate and the secondary nut are not locked in position, flutter can occur.

The lock unit 80 of this disclosure therefore operates to provide this locking engagement in the state of the secondary load path being engaged.

As can be seen in FIG. 4D, which shows a cross-section through the lock unit in the locked position, as the transfer plate 65 moves down (arrow A) relative to the secondary nut 70, so that they engage along the top edge 651 of the opening 650, the slidable lock 100 moves down relative to the secondary nut. The lock 100 is shaped to have a locking end 102 that has a size corresponding to the larger gap G created when the top gap is closed and edge 651 is in contact with the transfer plate 65 and as this locking end 102 moves down (A) into alignment with the larger gap G it is able to move into that gap G under the force of the spring 110, as the spring expands. This then blocks any relative movement between the secondary nut and the transfer plate.

Further, as also seen in FIG. 4D, as the slidable lock 100 moves (in direction B) into the gap G to lock the secondary nut, it also slides over the ball 120 and is configured to push the ball down (direction A) against the end 851 of the switch 85. This activates the switch and the switch then provides an indication (e.g. to the flight control computer or to personnel) that the secondary load path is engaged (and locked). The assembly therefore provides reliable locking and detection of the engagement of the secondary load path.

As mentioned above, it is also necessary to check operation and function of the lock assembly and the switch to ensure that it is reliably detecting and indicating the engagement of the secondary load path. The checking operation is described with reference to FIGS. 5A to 5C. A check is performed to ensure that the lock is not jammed e.g. due to the presence of ice or dust/dirt. This check is performed, in the unlocked, disengaged state of normal, primary load path operation (FIGS. 5A and 5B). The maintenance cap 90 of the lock unit is removed and a tool e.g. a screw or the like is engaged with the end 104 (opposite the locking end 102) of the lock 100 and is used to rotate (direction R (either clockwise or anti-clockwise) the lock to cause the lock to move in a direction B' away from the secondary nut in the lock unit. The lock therefore moves against the force of the spring 110, further compressing the spring and slides over the ball 120 such that the recess 106 moves away from the ball 120 and the body of the slider adjacent the recess (between the recess and the locking end 102) pushes against the ball 120 against the end 851 of the switch 85 in direction A to activate the switch. The switch then indicates that the lock is able to move and is not jammed, which confirms reliable functioning of the lock.

The assembly of this disclosure is therefore able to ensure locking of the secondary load path parts when needed, as well as providing a reliable indication that the secondary load path is engaged and is also capable of being checked in a simple and reliable manner. No 'fuses'—i.e. parts that are destroyed to provide the engagement indication—are used and so the assembly is re-usable and does not require the assembly to be dismantled for re-setting/re-use.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A secondary load path assembly comprising:
   a secondary load path comprising:
      a plate;
      a secondary nut; and
      a transfer plate secured to the plate and configured to connect the plate and the secondary nut in load transfer engagement, the transfer plate having an opening therethrough (therethrough, an axis defined through the opening, and the secondary nut protruding axially through the opening; wherein, in a state in which load is not transmitted via the secondary load path, a clearance is provided between the secondary nut and the opening;
   a locking unit configured to lock the secondary nut to the transfer plate when load is to be transmitted through the secondary path, the locking unit comprising a lock arranged to axially move to a lock position in which it is located in the clearance between the secondary nut and the opening to lock the secondary nut to the transfer plate; and
   means for indicating when the lock is in the lock position, wherein the means for indicating when the lock is in the lock position comprises a switch arranged to be activated by the lock in the lock position and a ball located between the lock and the switch the lock and the ball being configured such that as the lock moves into the lock position it pushes against the ball to engage with and activate the switch.

2. The assembly of claim 1, wherein the locking unit is mounted to the transfer plate.

3. The assembly of claim 1, wherein the locking unit further comprises:
   a lock spring arranged to bias the lock towards the opening in the transfer plate such that when the secondary nut moves relative to the transfer plate to close the clearance on one side of the opening, a gap (G) is formed between the secondary nut and an opposite side of the opening and the lock moves axially under the bias of the lock spring into the gap (G) to secure the secondary nut against movement in the opening relative to the transfer plate.

4. The assembly of claim 1, wherein the lock includes a lock body and a locking end,
   wherein the locking end being configured to fit within the gap (G) in the lock position and the lock body having a recess formed therein to receive the ball, such that when the lock is not in the lock position, the ball is located in the recess and does not activate the switch and when the lock is in the lock position, the ball is not located in the recess and is pushed by the lock body against, and to activate the switch.

5. The assembly of claim 1, wherein the lock is formed to receive a tool to cause axial movement of the lock away from the transfer plate to verify correct functioning of the lock.

6. The assembly of claim 1, wherein the lock is formed to receive a tool to cause axial movement of the lock away from the transfer plate to verify correct functioning of the lock; and
   wherein rotation of the lock by a tool causes the lock to move against the bias of the spring such that the ball is not located in the recess and the switch is activated to verify correct functioning of the lock.

7. The assembly of claim 1, further comprising:
   a maintenance cap to cover the locking unit.

8. The assembly of claim 7, wherein the maintenance cap is removably fitted over the lock unit by means of screw fasteners.

9. The assembly of claim 2, wherein the locking unit is secured to the transfer plate by screw fasteners.

10. A force transmitting shaft assembly having a primary load transfer path and a secondary load transfer path assembly as claimed in claim 1.

11. A trimmable horizontal stabiliser actuator (THSA), comprising:
    a force transmitting shaft assembly as claimed in claim 10.

12. The THSA of claim 11, wherein the plate is a failsafe plate secured to an aircraft having the THSA.

* * * * *